United States Patent
Kawamura (10) Patent No.: US 8,602,545 B2
(45) Date of Patent: Dec. 10, 2013

(54) TREATMENT SOLUTION FOR INK-JET RECORDING, WATER-BASED INK SET FOR INK-JET RECORDING, INK-JET RECORDING METHOD AND INK-JET RECORDING APPARATUS

(75) Inventor: Eiji Kawamura, Konan (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 230 days.

(21) Appl. No.: 13/273,732

(22) Filed: Oct. 14, 2011

(65) Prior Publication Data

US 2012/0092413 A1    Apr. 19, 2012

(30) Foreign Application Priority Data

Oct. 15, 2010    (JP) ................................. 2010-232583

(51) Int. Cl.
*B41J 2/01*    (2006.01)
(52) U.S. Cl.
USPC .................. 347/96; 347/95; 347/98; 347/100
(58) Field of Classification Search
USPC ................ 347/21, 28, 95–100; 523/160, 161; 106/31.13, 31.6
See application file for complete search history.

(56) References Cited

U.S. PATENT DOCUMENTS

| | | | |
|---|---|---|---|
| 5,609,671 A | 3/1997 | Nagasawa | |
| 5,624,484 A * | 4/1997 | Takahashi et al. | 106/31.75 |
| 5,837,045 A | 11/1998 | Johnson et al. | |
| 2006/0010619 A1 | 1/2006 | Hees et al. | |
| 2006/0201380 A1 | 9/2006 | Kowalski et al. | |
| 2007/0076075 A1* | 4/2007 | Schmid et al. | 347/102 |
| 2007/0100023 A1 | 5/2007 | Burns et al. | |
| 2007/0100024 A1 | 5/2007 | Gu et al. | |
| 2008/0066881 A1* | 3/2008 | Riehle et al. | 162/164.3 |
| 2008/0241398 A1 | 10/2008 | Kato et al. | |
| 2010/0003408 A1* | 1/2010 | Yanagi et al. | 427/256 |

FOREIGN PATENT DOCUMENTS

| | | |
|---|---|---|
| JP | 08-003498 | 1/1996 |
| JP | 11-314449 | 11/1999 |
| JP | 2000-513396 | 10/2000 |
| JP | 2006-501376 | 1/2006 |
| JP | 2007-161753 | 6/2007 |
| JP | 2008-524400 | 7/2008 |
| JP | 2008-246821 | 10/2008 |
| JP | 2009-515007 | 4/2009 |

* cited by examiner

*Primary Examiner* — Matthew Luu
*Assistant Examiner* — Rut Patel
(74) *Attorney, Agent, or Firm* — Banner & Witcoff, Ltd.

(57) ABSTRACT

A treatment solution used for ink-jet recording, including: polyallylamine contained in the treatment solution in an amount of 0.5% by weight to 10% by weight; polyamide-polyamine-epihalohydrin copolymer contained in the treatment solution in an amount of 0.3% by weight to 2% by weight; and water.

7 Claims, 3 Drawing Sheets

TREATMENT SOLUTION FOR INK-JET RECORDING, WATER-BASED INK SET FOR INK-JET RECORDING, INK-JET RECORDING METHOD AND INK-JET RECORDING APPARATUS

CROSS REFERENCE TO RELATED APPLICATION

The present application claims priority from Japanese Patent Application No. 2010-232583 filed on Oct. 15, 2010 the disclosure of which is incorporated herein by reference in its entirety.

BACKGROUND OF THE INVENTION

1. Field of the Invention

The present invention relates to a treatment solution for ink-jet recording, a water-based ink set for ink-jet recording, an ink-jet recording method and an ink jet recording apparatus.

2. Description of the Related Art

In some cases, ink-jet recording is performed by using a treatment solution in which polyallylamine (PAA) is blended, for the purpose of improving optical density (OD value) of an image recorded with a water-based ink using a pigment. The PAA contained in the treatment solution is capable of causing the pigment in the water-based ink to aggregate on a recording medium, consequently making it possible to improve the optical density (OD value) of the recorded image.

However, in a case that the PAA is singly used as the pigment aggregating agent in the treatment solution, the water-based ink is placed on a surface of the recording medium but is not fixed satisfactorily to the surface, and thus the resisting property against highlighter-pen (highlighter-resisting property) is not sufficient as compared with a case in which the PAA is not used. Namely, the improvement in the optical density (OD value) of the recorded image and the highlighter-resisting property are in a trade-off relationship. On the other hand, the treatment solution for ink-jet recording as described above is also required to have sufficient fluidity after evaporation (after-evaporation fluidity). When the after-evaporation fluidity is not satisfactory, for example, in a case that the treatment solution is discharged onto the recording medium from an ink-jet head, the fluidity is lost after the treatment solution has been left to stand in the ink-jet head for a predetermined period of time and has evaporated, which in turn causes discharge failure. Further, also in a case of applying the treatment solution to the recording medium by a system or method such as stamp coating (application), brush coating, roller coating, etc., there is also a fear that uneven coating might be caused due to the unsatisfactory after-evaporation fluidity, and that a flow passage (flow channel) for the treatment solution in the ink-jet recording apparatus might be closed or clogged.

In view of the above situation, an object of the present invention is to provide a treatment solution for ink-jet recording which is capable of improving the optical density (OD value) of the recorded image and which has excellent highlighter-resisting property and excellent after-evaporation fluidity.

SUMMARY OF THE INVENTION

According to a first aspect of the present teaching, there is provided a treatment solution used for ink-jet recording, including:

polyallylamine contained in the treatment solution in an amount of 0.5% by weight to 10% by weight;

polyamidepolyamine-epihalohydrin copolymer contained in the treatment solution in an amount of 0.3% by weight to 2% by weight; and water.

According to a second aspect of the present teaching, there is provided a water-based ink set for ink-jet recording, including: a water-based ink for ink-jet recording containing a pigment, water and a water-soluble organic solvent; and the treatment solution of the first aspect.

According to a third aspect of the present teaching, there is provided an ink-jet recording method for performing recording on a recording medium, the method including: applying, to the recording medium, the treatment solution of the water-based ink set for ink-jet recording of the second aspect; and discharging, to the recording medium, the water-based ink of the water-based ink set for ink-jet recording.

According to a fourth aspect of the present teaching, there is provided an ink-jet recording apparatus which performs recording on a recording medium, the apparatus including: an ink-set accommodating section which accommodates the water-based ink set for ink-jet recording of the second aspect therein; a treatment solution applying mechanism which applies, to the recording medium, the treatment solution of the water-based ink set for ink-jet recording; and an ink discharge mechanism which discharges, to the recording medium, the water-based ink of the water-based ink set.

DESCRIPTION OF THE PREFERRED EMBODIMENTS

In the present teaching, the term "fluidity after evaporation" or "after-evaporation fluidity" means, for example, a fluidity of the treatment solution obtained after the treatment solution is made to be evaporated inside an open vial (open container) and then the open vial is inclined.

In the present teaching, the term "highlighter-resisting property" means a property or state that when a text portion, recorded with a water-based ink, is traced with a highlighter-pen or highlighter having a fluorescent color, there is no flowing out of the ink from the text, there is no blurring in the text and the tip of the highlighter is not dirtied.

As described above, the treatment solution of the present teaching is a treatment solution used for ink-jet recording and including: polyallylamine (hereinafter also referred to as "component (A)" or "PAA"); polyamidepolyamine-epihalohydrin copolymer (hereinafter also referred to as "component (B)" or "PAE"); and water. The treatment solution of the present teaching may include a component different from the components (A), (B) and the water.

The component (A) causes a pigment negatively charged in the water-based ink to aggregate on a recording medium when the treatment solution and the water-based ink are brought into contact with each other on the recording medium, to thereby improve the optical density (OD value) of the recorded image. However, the fixing property (fixability) of the aggregate of the component (A) and the pigment to the recording medium is not sufficient, and the highlighter-resisting property is low.

The inventor found out that the highlighter-resisting property is improved by using the component (B) in the treatment solution. The mechanism therefor is assumed to be as follows. The component (B) has a cation (N⁺) derived from amine and an epoxy group derived from epihalohydrin. When the treatment solution and the water-based ink are brought into contact with each other on a recording medium, the cation (N⁺) of the component (B) and the negatively-charged pigment in the water-based ink react to each other, causing the epoxy group of the component (B) to react with a hydroxyl group possessed by cellulose in the recording medium. With this, the pigment and the recording medium are crosslinked by the component (B), and thus the highlighter-resisting property is improved. Further, since the component (B) has the effect of causing the pigment to aggregate by the cation derived from the amine, in a similar manner as the component (A) as described above, the component (B) also contributes to the improvement in the optical density (OD value).

However, the pigment-aggregating function of the component (B), namely the function of improving the optical density, is lower than that of the component (A). If an attempt is made to improve the optical density only with the component (B) by increasing the concentration of the component (B) in the treatment solution, there arises a problem such that the fluidity after evaporation is lowered. In view of this situation, the inventor found out a treatment solution resolving the problem of trade-off between the optical density of the recorded image and the highlighter-resisting property and also having the fluidity after evaporation, by using the component (A) and the component (B) together at appropriate concentrations, respectively.

The blending amount of the component (A) (active-ingredient amount conversion; active-ingredient conversion rate) is 0.5% by weight to 10% by weight with respect to the total amount of the treatment solution. By making the blending amount (active-ingredient amount conversion) of the component (A) be not less than 0.5% by weight and by adjusting the blending amount of the component (B) as will be described later on, it is possible to improve the optical density (OD value) of a recorded image. Further, by making the blending amount (active-ingredient amount conversion) of the component (A) be not more than 10% by weight and by adjusting the blending amount of the component (B) as will be described later on, it is possible to obtain a treatment solution having excellent highlighter-resisting property and excellent after-evaporation fluidity. The blending amount (active-ingredient amount conversion) of the component (A) is preferably 1% by weight to 6% by weight; is more preferably 2% by weight to 4% by weight. Note that the term "active-ingredient amount conversion" means, for example, in a case that an aqueous solution of the component (A) is used, an amount of the component (A) itself, excluding the water.

It is allowable to use, as the component (A), a commercially available product. Examples of the commercially available product include "PAA (trade name)-01", "PAA (trade name)-03", "PAA (trade name)-08" produced by Nitto Boseki Co., Ltd., etc.

It is preferable that the component (B) is a copolymer represented by the following general formula (1):

in the general formula (1), each of "a", "b", "c" and "n" is a positive integer; and X⁻ is a halide ion.

Further, it is preferable that in the general formula (1), "a" is 4; each of "b" and "c" is 2; and X⁻ is a chloride ion (Cl⁻).

As the component (B), it is preferable to use those in which a viscosity at the active ingredient amount of 25% by weight is 5 mPa-second to 10,000 mPa-second, more preferable to use those in which a viscosity at the active ingredient amount of 25% by weight is 5 mPa-second to 1,000 mPa-second; is further preferable to use those in which a viscosity at the active ingredient amount of 25% by weight is 10 mPa-second to 100 mPa-second. In a case that the viscosity of the component (B) is within the above-described preferable ranges, the viscosity of the treatment solution which contains the component (B) can be easily adjusted to be an appropriate value for being discharged by an ink-jet head. The above-mentioned viscosity is a value measured at 25 degrees Celsius with a Brookfield Viscometer.

The blending amount of the component (B) (active-ingredient amount conversion) is 0.3% by weight to 2% by weight with respect to a total amount of the treatment solution. By making the blending amount (active-ingredient amount conversion) of the component (B) be not less than 0.3% by weight and by adjusting the blending amount of the component (A) as described above, it is possible to obtain a treatment solution capable of improving the optical density (OD value) of a recorded image and also having excellent highlighter-resisting property. Further, by making the blending amount (active-ingredient amount conversion) of the component (B) be not more than 2% by weight and by adjusting the blending amount of the component (A) as described above, it is possible to obtain a treatment solution having excellent after-evaporation fluidity. The blending amount (active-ingredient amount conversion) of the component (B) is preferably 0.5% by weight to 1.5% by weight; is more preferably 0.5% by weight to 1% by weight. Note that the term "active-ingredient amount conversion" means, for example, in a case that an aqueous solution of the component (B) is used, an amount of the component (B) itself, excluding the water.

It is allowable to use, as the component (B), a commercially available product. Examples of the commercially available product include "Suparamin (trade name) C-305" produced by Toho Chemical Industry, Co., Ltd., "Arafix (trade name) 255LOX" produced by Arakawa Chemical Industries, Ltd., "Sumirez Resin (trade name) 675A" produced by Taoka Chemical Co., Ltd., etc.

As described above, since the treatment solution of the present teaching contains the component (A) in an amount of 0.5% by weight to 10% by weight and contains the component (B) in an amount of 0.3% by weight to 2% by weight, the treatment solution improves the optical density (OD value) of the recorded image and the highlighter-resisting property, and also has an excellent after-evaporation fluidity of the treatment solution itself. In view of these three properties, namely from the point of view of improving the optical density (OD value) of the recorded image, the highlighter-resisting property and the after-evaporation fluidity in a well-balanced manner, it is preferable that the treatment solution of the present teaching contains the component (A) in an amount of 1% by weight to 6% by weight and contains the component (B) in an amount of 0.5% by weight to 1.5% by weight; and it is more preferable that the treatment solution of the present teaching contains the component (A) in an amount of 2% by weight to 4% by weight and contains the component (B) in an amount of 0.5% by weight to 1% by weight. On the other hand, in a case that importance is attached to the improvement in optical density (OD value) of the recorded image, it is preferable for example that the treatment solution of the present teaching contains the component (A) in an amount of 6% by weight to 10% by weight and contains the component (B) in an amount of 1% by weight to 2% by weight, since as the blending mounts of the components (A) and (B) in the treatment solution are relatively great, the optical density of the recorded image tends to greatly improve. Further, in a case that importance is attached to the highlighter-resisting property, it is preferable for example that the treatment solution of the present teaching contains the component (A) in an amount of 0.5% by weight to 2% by weight and contains the component (B) in an amount of 1% by weight to 2% by weight, since as the blending mount of the component (A) in the treatment solution is relatively small and the blending amount of the component (B) in the treatment solution is relatively great, the highlighter-resisting property tends to greatly improve. Furthermore, in a case that importance is attached to the after-evaporation fluidity, it is preferable for example that the treatment solution of the present teaching contains the component (A) in an amount of 0.5% by weight to 2% by weight and contains the component (B) in an amount of 0.3% by weight to 1% by weight, since as the blending mounts of the components (A) and (B) in the treatment solution are both relatively small, the after-evaporation fluidity tends to greatly improve.

The water which is used in the treatment solution is preferably ion-exchanged water or pure water (purified water). The blending amount of water with respect to the total amount (entire amount) of the treatment solution is, for example, the balance of the treatment solution, excluding the other component(s).

The treatment solution may further include a water-soluble organic solvent. As the water-soluble organic solvent, it is allowable to use publicly known products or substances. The water-soluble organic solvent include, for example, polyvalent (polyhydric) alcohol, polyvalent alcohol derivative, alcohol, amide, ketone, ketoalcohol (ketone alcohol), ether, nitrogen-containing solvent, sulfur-containing solvent, propylene carbonate, ethylene carbonate, 1,3-dimethyl-2-imidazolidinone, etc. The polyvalent alcohol includes, for example, glycerol, ethylene glycol, propylene glycol, butylene glycol, hexylene glycol, diethylene glycol, triethylene glycol, polyethylene glycol, dipropylene glycol, tripropylene glycol, polypropylene glycol, trimethylolpropane, 1,5-pentanediol, 1,2,6-hexanetriol, etc. The polyvalent alcohol derivative includes, for example, ethylene glycol methyl ether, ethylene glycol ethyl ether, ethylene glycol-n-propyl ether, ethylene glycol-n-butyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, and tripropylene glycol-n-butyl ether, etc. The alcohol includes, for example, methyl alcohol, ethyl alcohol, n-propyl alcohol, isopropyl alcohol, n-butyl alcohol, sec-butyl alcohol, isobutyl alcohol, tert-butyl alcohol, benzyl alcohol, etc. The amide includes, for example, dimethylformamide, dimethylacetamide, etc. The ketone includes, for example, acetone, etc. The ketone alcohol (ketoalcohol) includes, for example, diacetone alcohol, etc. The ether includes, for example, tetrahydrofuran, dioxane, etc. The nitrogen-containing solvent includes, for example, pyrrolidone, 2-pyrrolidone, N-methyl-2-pyrrolidone, cyclohexyl pyrrolidone, triethanolamine, etc. The sulfur-containing solvent includes, for example, thiodiethanol, thiodiglycol, thiodiglycerol, sulfolane, dimethylsulfoxide, etc. The blending amount of the water-soluble organic solvent with respect to the entire amount of the treatment solution is not particularly limited. One kind of the water-soluble organic solvent may be used, or two or more kinds of the water-soluble organic solvent may be used together.

It is allowable that the treatment solution contains a colorant, or it is allowable that the treatment solution does not contain any colorant. In a case that the treatment solution contains a colorant, it is preferable that the colorant is contained in the treatment solution in an amount to an extent not affecting the recording of image and/or letter, etc.

The treatment solution may further contain a conventionally known additive, if necessary. The additive includes, for example, surfactants, pH-adjusting agents, viscosity-adjusting agents, surface tension-adjusting agents, antioxidants, and fungicides. The viscosity-adjusting agents include, for example, polyvinyl alcohol, cellulose, water-soluble resin, etc.

The treatment solution can be prepared, for example, by mixing the component (A), the component (B) and water, and optionally other additive component(s) as necessary uniformly or homogeneously by any conventionally known method.

As described above, the treatment solution for ink-jet recording of the present teaching is capable of improving the optical density (OD value) of a recorded image and has excellent highlighter-resisting property and excellent after-evaporation fluidity. Accordingly, for example, in a case that the treatment solution of the present teaching is discharged onto a recording medium with an ink-jet head, it is possible to suppress the occurrence of discharge failure. Further, for example, in a case that the treatment solution of the present teaching is applied to a recording medium by a system or method such as roller coating, etc., it is possible to suppress the occurrence of uneven coating (uneven application), and to prevent a flow passage of the treatment solution in an ink-jet recording apparatus from being closed or clogged.

A water-based ink for ink-jet recording (hereinafter referred to also simply as "water-based ink" or "ink"), which is usable together with the treatment solution of the present teaching, is not particularly limited. For example, it is allowable to use, as the water-based ink, a water-based ink which is to be explained next regarding a water-based ink set for ink-jet recording.

Next, an explanation will be given about a water-based ink set for ink-jet recording (hereinafter also referred to simply as "water-based ink set" or "ink set") of the present teaching. The water-based ink set of the present teaching is a water-based ink set including a water-based ink and a treatment solution, wherein the water-based ink is a water-based ink containing a pigment, water and a water-soluble organic solvent; and the treatment solution is the treatment solution of the present teaching. The water-based ink set in which the pigment ink and the treatment solution of the present teaching are used in combination is capable of improving the optical density (OD value) of recorded image, and has excellent highlighter-resisting property and excellent after-evaporation fluidity.

The pigment includes, for example, carbon black, an inorganic pigment, an organic pigment, etc. The carbon black includes, for example, furnace black, lamp black, acetylene black, channel black, etc. The inorganic pigment includes, for example, titanium oxide, inorganic pigments based on iron oxide, and inorganic pigments based on carbon black. The organic pigment includes, for example, azo-pigments such as azo lake, insoluble azo-pigment, condensed azo-pigment, chelate azo-pigment and the like; polycyclic pigments such as phthalocyanine pigment, perylene and perynon pigments, anthraquinone pigment, quinacridone pigment, dioxadine pigment, thioindigo pigment, isoindolinone pigment, quinophthalone pigment and the like; dye lake pigments such as basic dye type lake pigment, acid dye type lake pigment and the like; nitro pigments; nitroso pigments; aniline black daylight fluorescent pigment; and the like. Any other pigment is also usable provided that the pigment is dispersible in a water phase (aqueous phase). Specific example of the pigments as described above include, for example, C. I. Pigment Blacks 1, 6, and 7; C. I. Pigment Yellows 1, 2, 3, 12, 13, 14, 15, 16, 17, 55, 78, 150, 151, 154, 180, 185, and 194; C. I. Pigment Oranges 31 and 43; C. I. Pigment Reds 2, 3, 5, 6, 7, 12, 15, 16, 48, 48:1, 53:1, 57, 57:1, 112, 122, 123, 139, 144, 146, 149, 166, 168, 175, 176, 177, 178, 184, 185, 190, 202, 221, 222, 224, and 238; C. I. Pigment Violet 196; C. I. Pigment Blues 1, 2, 3, 15, 15:1, 15:2, 15:3, 15:4, 16, 22, and 60; C. I. Pigment Greens 7 and 36; and the like.

The pigment may be a self-dispersible pigment. The self-dispersible pigment is dispersible in water without using any dispersing agent, for example, owing to the fact that at least one of the hydrophilic functional group and the salt thereof including, for example, carbonyl group, hydroxyl group, carboxylic acid group, sulfonic acid group (sulfonate group), phosphoric acid group (phosphate group), etc. is introduced into the surfaces of the pigment particles by the chemical bond directly or with any group intervening therebetween. It is possible to use self-dispersible pigments subjected to the surface treatment by any one of methods described, for example, in Japanese Patent Application Laid-open No. 8-3498 and Published Japanese Translation of PCT International Publication for Patent Application No. 2000-513396, Published Japanese Translation of PCT International Publication for Patent Application No. 2008-524400, Published Japanese Translation of PCT International Publication for Patent Application No. 2009-515007, etc. It is possible to use, as a material for the self-dispersible pigment, either one of the inorganic pigment and the organic pigment. Further, a pigment which is suitable for the above-described treatment includes for example carbon black such as "MA8" and "MA100" produced by Mitsubishi Chemical Corporation and "Color Black FW200" produced by Degussa. As the self-dispersible pigment, it is possible, for example, to use a commercially available product. The commercially available product includes, for example, "CAB-O-JET (trade name) 200", "CAB-O-JET (trade name) 250C", "CAB-O-JET (trade name) 260M", "CAB-O-JET (trade name) 270Y", "CAB-O-JET (trade name) 300", "CAB-O-JET (trade name) 400", "CAB-O-JET (trade name) 450C", "CAB-O-JET (trade name) 465M" and "CAB-O-JET (trade name) 470Y" produced by Cabot Specialty Chemicals; "BONJET (trade name) BLACK CW-2" and "BONJET (trade name) BLACK CW-3" produced by Orient Chemical Industries, Ltd.; "LIO-JET (trade name) WD BLACK 002C" produced by Toyo Ink Mfg. Co., Ltd.; and the like.

The solid content blending amount of the pigment (pigment solid content) with respect to the entire amount of the water-based ink is not particularly limited, and may be appropriately determined based on, for example, desired optical density or color (hue, tint), etc. The pigment solid content is, for example, 0.1% by weight to 20% by weight, is preferably 1% by weight to 10% by weight, and is more preferably 2% by weight to 8% by weight.

The water-based ink may include a dye, etc. as a colorant, in addition to the above-described pigment.

The water used in the water-based ink is preferably ion-exchanged water or pure water (purified water). The blending amount of water (water ratio) with respect to the entire amount of the water-based ink is, for example, 10% by weight to 90% by weight, and is preferably 40% by weight to 80% by weight. The water ratio may be, for example, the balance of the ink, excluding the other components.

The water-soluble organic solvent used in the water-based ink includes, for example, a humectant which prevents the water-based ink from drying at an end of the nozzle in the ink-jet head and a penetrant which adjusts the drying speed of the water-based ink on a recording medium.

The humectant is not particularly limited, and includes, for example, lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyvalent (polyhydric) alcohols such as polyalkylene glycol, alkylene glycol, and glycerol; 2-pyrrolidone; N-methyl-2-pyrrolidone; and 1,3-dimethyl-2-imidazolidinone. The polyalkylene glycol is not limited, and includes, for example, polyethylene glycol and polypropylene glycol. The alkylene glycol is not limited, and includes, for example, ethylene glycol, propylene glycol, butylene glycol, diethylene glycol, triethylene glycol, dipropylene glycol, tripropylene glycol, thiodiglycol, and hexylene glycol. It is allowable that only one kind of the humectant as described above is used, or two or more kinds of the humectants are used in combination. Among the above-described humectants, it is preferable to use polyvalent alcohols such as alkylene glycol, glycerol, etc.

The blending amount of the humectant with respect to the entire amount of the water-based ink is, for example, 0% by weight to 95% by weight, is preferably 5% by weight to 80% by weight, and is more preferably 5% by weight to 50% by weight.

The penetrant is not limited, and includes, for example, glycol ether. The glycol ether is not limited, and includes, for example, ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, and tripropylene glycol-n-butyl ether. It is allowable that only one kind of the penetrant as described above is used, or two or more kinds of the penetrants are used in combination.

The blending amount of the penetrant with respect to the entire amount of the water-based ink is, for example, 0% by weight to 20% by weight, is preferably 0.1% by weight to 15% by weight, and is more preferably 0.5% by weight to 10% by weight.

The water-based ink may further contain a conventionally known additive, if necessary. The additive includes, for example, surfactants, pH-adjusting agents, viscosity-adjusting agents, surface tension-adjusting agents, and fungicides. The viscosity-adjusting agents include, for example, polyvinyl alcohol, cellulose, water-soluble resin, etc.

The water-based ink can be prepared, for example, by mixing the pigment, water, a water-soluble organic solvent, and optionally other additive component(s) as necessary uniformly or homogeneously with any conventionally known method, and by removing undissolved matters by a filter or the like.

Next, in the present teaching, the water-based ink set for ink-jet recording can be provided also as an ink cartridge. The ink cartridge of the present teaching is, for example, an ink cartridge having an ink accommodating section and a treatment solution accommodating section, wherein the ink accommodating section accommodates the water-based ink of the present teaching and the treatment solution accommodating section accommodates the treatment solution of the present teaching. The ink cartridge of the present teaching may further include an accommodating section for another water-based ink other than the water-based ink of the present teaching.

The ink cartridge of the present teaching may be an ink cartridge assembly in which a water-based ink cartridge and a treatment solution cartridge, which are formed independently (distinctively) from each other, are assembled or collected; or may be an integrated-type ink cartridge of which an inner space is partitioned to define an ink accommodating section and a treatment solution accommodating section. It is allowable to use, for example, a conventionally known body for ink cartridge as the body of the ink cartridge of the present teaching.

Next, explanation will be given about an ink-jet recording method and an ink-jet recording apparatus of the present teaching.

The ink-jet recording method of the present teaching is an ink-jet recording method for performing recording on a recording medium by using a water-based ink set including a water-based ink and a treatment solution for ink-jet recording, the method including: applying the treatment solution to the recording medium; and performing recording on the recording medium by discharging (jetting) the water-based ink by the ink-jet system (in the ink-jet manner) to the recording medium, wherein the water-based ink set for ink-jet recording of the present teaching is used as the water-based ink set.

The ink-jet recording apparatus of the present teaching is an ink-jet recording apparatus including: an ink-set accommodating section which accommodates the water-based ink set for ink-jet recording of the present teaching therein; and a treatment solution applying mechanism which applies, to a recording medium, the treatment solution constructing the water-based ink set for ink-jet recording; and an ink discharge mechanism which discharges, to the recording medium, the water-based ink constructing the water-based ink set for ink-jet recording.

The ink-jet recording method of the present teaching can be carried out by, for example, using the ink-jet recording apparatus of the present teaching. The recording includes printing text (character, letter), printing image or picture, and printing, etc.

Figure 1:
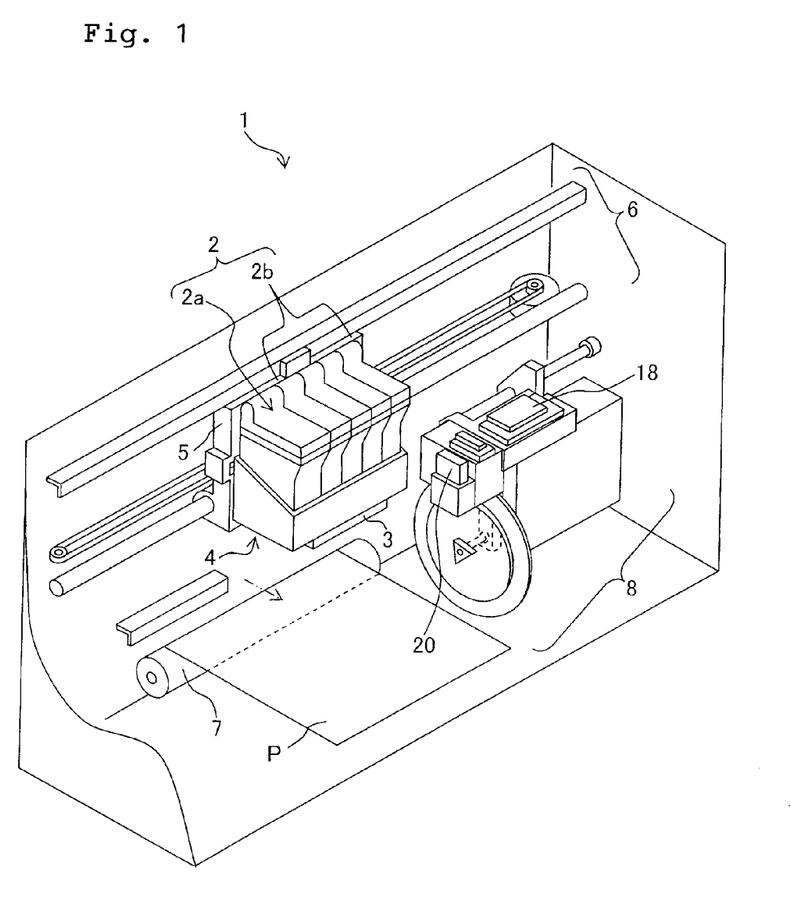
FIG. 1 is a schematic perspective view of construction of an example of an ink jet recording apparatus of the present teaching.

FIG. 1 is a schematic perspective view of construction of an example of an ink-jet recording apparatus of the present teaching. As shown in FIG. 1, an ink-jet recording apparatus 1 of the present teaching includes an ink cartridge assembly 2, an ink discharge mechanism (ink-jet head) 3, a head unit 4, a carriage 5, a driving unit 6, a platen roller 7 and a purge device 8 as main constitutive components or parts.

The ink cartridge assembly 2 includes a treatment solution cartridge 2a and four water-based ink cartridges 2b. The treatment solution cartridge 2a contains the treatment solution of the present teaching. The four water-based ink cartridges 2b contain four colors of water-based inks respectively, the four colors being yellow, magenta, cyan and black. The water-based ink of the present teaching, namely, a water-based ink containing a pigment, water and a water-soluble organic solvent, is used as at least one of the water-based inks of four colors.

The ink-jet head 3 disposed on the head unit 4 performs recording on a recording medium (for example, recording paper or recording paper sheet) P. The ink cartridge assembly 2 and the head unit 4 are provided or arranged on the carriage 5. The driving unit 6 reciprocates the carriage 5 in a linear direction. As the driving unit 6, it is possible to use, for example, a conventionally known driving unit (see, for example, Japanese Patent Application laid-open No. 2008-246821). The platen roller 7 extends in the reciprocating direction of the carriage 5 and is arranged to face or be opposite to the ink-jet head 3.

The purge device 8 sucks or draws unsatisfactory ink (poor ink) which contains air bubbles, etc. accumulated or trapped in the ink-jet head 3. As the purge device 8, it is possible to use, for example, a conventionally known purge device (for example, see Japanese Patent Application laid-open No. 2008-246821).

A wiper member 20 is provided on the purge device 8, at a position on the side of the platen roller 7 such that the wiper member 20 is adjacent to the purge device 8. The wiper member 20 is formed to have a spatula shape, and wipes a nozzle-formed surface of the ink-jet head 3 accompanying with the movement (reciprocating movement) of the carriage 5. In FIG. 1, a cap 18 is provided to cover a plurality of nozzles of the ink-jet head 3 which is returned to a reset position upon completion of the recording, so as to prevent the treatment solution and the water-based ink from drying.

In the ink-jet recording apparatus 1 of the present teaching, the ink cartridge assembly 2 is provided, together with the head unit 4, on one carriage 5. However, the present teaching is not limited to this. In the ink-jet recording apparatus, each of the cartridges of the ink cartridge assembly 2 may be provided on a carriage which is different (separate) from the carriage on which the head unit 4 is provided. Alternatively, each of the cartridges of the ink cartridge assembly 2 may be arranged and fixed inside the ink-jet recording apparatus, rather than being provided on the carriage 5. In such aspects, for example, each of the cartridges of the ink cartridge assembly 2 and the head unit 4 which is provided on the carriage 5 are connected with a tube, etc., and the treatment solution and the water-based ink are supplied from the respective cartridges of the ink cartridge assembly 2 to the head unit 4 via the tubes.

Figure 2A:
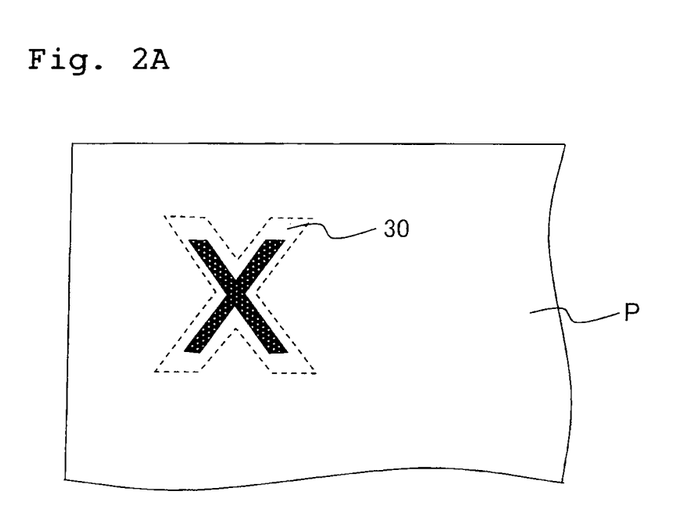
FIGS. 2A and 2B are images for illustrating examples of recording with an ink-jet recording method of the present teaching.
Figure 2B:
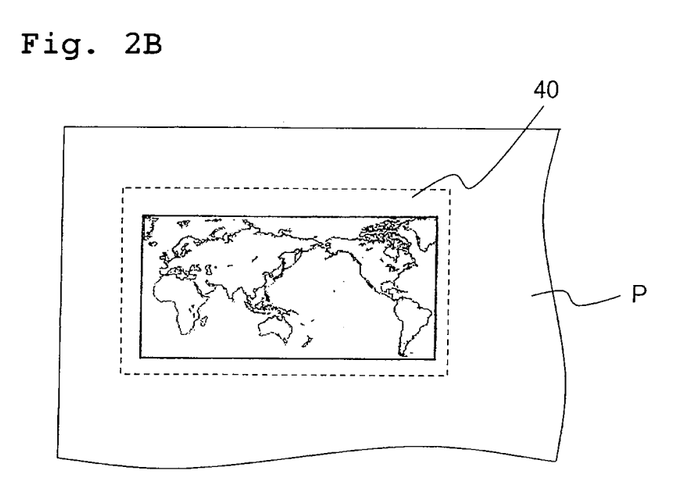

Ink-jet recording using the ink-jet recording apparatus 1 is performed, for example, in the following manner. Namely, at first, the treatment solution of the present teaching is applied (discharged) to the recording paper sheet P from the ink-jet head 3. The application of the treatment solution may be performed on an entire surface of a recording surface of the recording paper sheet P, or may be performed on a partial portion (a part) of the recording surface. In a case of applying the treatment solution to a partial portion of the recording surface of the recording paper sheet P (partial application), at least a recording portion, of the recording surface, on which the recording is performed (is to be performed) with the water-based ink, is an application portion. In the case of partial application, the size (dimension) of the application portion is preferably greater than that of the recording portion. For example, in a case that a letter "X" is to be recorded on the recording paper sheet P, it is preferable that the treatment solution is applied so that an application portion 30 is formed with a line width greater than the line width of the letter "X", as shown in FIG. 2A. Further, in a case that a pattern, an image, etc. is to be recorded on the recording paper sheet P, it is preferable that the treatment solution is applied so that an application portion 40 is formed to be greater than the pattern, etc., as shown in FIG. 2B.

Next, the water-based ink is discharged from the ink-jet head 3 to the application portion, of the recording paper sheet P, on which the treatment solution has been applied. The time (time interval) from the discharge of the treatment solution until the discharge of the water-based ink is not particularly limited. For example, it is allowable to perform the discharge of the water-based ink in a same scanning during which the discharge of the treatment solution is also performed. The treatment solution and the water-based ink are brought into contact with each other (make contact with each other) on the recording paper sheet P to thereby improve the optical density (OD value) of the recorded image and the highlighter-resisting property.

As in this example, it is preferable that the water-based ink is discharged after the treatment solution has been discharged first on the recording paper sheet P. By doing so, it is possible for example to enhance the aggregation efficiency of the pigment in the water-based ink. The present teaching, however, is not limited to this. In the present teaching, it is allowable to apply the treatment solution to the recording medium after the water-based ink has been discharged first to the recording paper sheet P; or it is allowable to perform the application of the treatment solution to the recording paper sheet P and the discharge of the water-based ink to the recording paper sheet P may be performed at the same time.

In the ink-jet recording apparatus 1 of the present teaching, the ink discharge mechanism functions also as the treatment solution applying mechanism. The present teaching, however, is not limited to this. In the present teaching, the application of the treatment solution may be performed, for example, by a system or method such as stamp coating (application), brush coating, roller coating, etc. Since the treatment solution of the present teaching does not lose the fluidity even if being heated by the ink discharge mechanism and evaporated, the treatment solution has excellent discharge stability, Further, since the treatment solution of the present teaching has excellent after-evaporation fluidity, the treatment solution does not cause any uneven coating or uneven application also in a case that the treatment solution is applied or coated by any system including the stamp coating, the brush coating, the roller coating, etc. Further, the treatment solution of the present teaching does not cause any closing or clogging of a flow passage in the ink-jet recording apparatus.

The recording paper sheet P on which the recording has been performed in such a manner is discharged from the ink-jet recording apparatus 1. In FIG. 1, a paper feeding mechanism and a paper discharging mechanism for the recording paper sheet P are omitted.

In the apparatus shown in FIG. 1, an ink-jet head of serial type (serial type ink-jet head) is adopted. However, the present teaching is not limited to this. The ink-jet recording apparatus may be an apparatus adopting an ink-jet head of line type (line type ink-jet head).

EXAMPLES

Next, examples of the present teaching will be explained together with comparative examples. Note that the present teaching is not limited and is not restricted to the examples and the comparative examples which will be described below.
(Preparation of Treatment Solution)

Components each indicated in Composition of Treatment Solution (TABLES 2 to 10) were mixed uniformly or homogeneously, and thus treatment solutions 1 to 104 were obtained. As shown in TABLES 2 to 10, three kinds of commercially available products having mutually different weight-average molecular weight were used as the component (A). Further, three kinds of commercially available products in which the viscosities, at active ingredient amount 25% by weight, are 62 mPa-second, 108.5 mPa-second and 79 mPa-second, respectively, were used as the component (B). These commercially available products used as the component (B) are the copolymer represented by the above-described general formula (1) wherein $X^-$ is a chloride ion ($Cl^-$).
(Preparation of Water-Based Ink)

Components except for a water dispersion of self-dispersible carbon black (self-dispersible carbon black water dispersion), which were included in Composition of Water-based Ink (TABLE 1) as indicated below, were mixed uniformly or homogeneously; and thus an ink solvent was obtained. Subsequently, the ink solvent was added to the self-dispersible carbon black water dispersion, followed by being mixed uniformly. After that, the obtained mixture was filtrated through a cellulose acetate membrane filter (pore size 3.00 μm) produced by Toyo Roshi Kaisha, Ltd., and thus a water-based ink for ink-jet recording was obtained.

TABLE 1

| Composition of Water-based Ink | Blending amount (% by weight) |
|---|---|
| CAB-O-JET (trade name) 300 (*9) | 26.67 |
| | (4.0) |
| Glycerol (85% by weight concentration) (*3) | 32.00 |
| Diethylene glycol | 4.00 |
| Dipropylene glycol-n-propyl ether | 2.00 |
| SUNNOL (trade name) NL1430 (*10) | 0.20 |
| | (0.05) |
| ORFIN (trade name) E1010 (*11) | 0.25 |
| PROXEL GXL(S) (*12) | 0.02 |
| Water | balance |

(*9): Water dispersion of self-dispersible carbon black, produced by Cabot, carbon black concentration = 15% by weight; (parenthesized numeral indicates pigment solid content amount).
(*3): Produced by Kao Corporation.
(*10): Sodium polyoxyethylene alkyl (C = 12, 13) ether sulfate (3E.O.), produced by Lion Corporation; active ingredient amount: 28% by weight; (parenthesized numeral indicates active ingredient amount).
(*11): Acetylene glycol surfactant (ethylene oxide (10 mol) adduct of acetylene diol); manufactured by Nisshin Kagaku Kogyo KK.
(*12): Fungicidal agent, produced by Arch Chemicals Japan Kabushiki Kaisha.

Examples 1-61 and Comparative Examples 1-43

The treatment solutions 1-104 were each used in combination with the water-based ink for ink-jet recording to record an image; and (a) evaluation of the optical density (OD value)

of the recorded image and (b) evaluation of highlighter-resisting property were performed in the following manner. Further, (c) evaluation of fluidity after evaporation (after-evaporation fluidity) was performed for the treatment solutions 1-104 in the following manner. Note that samples used for (a) the evaluation of the optical density (OD value) of the recorded image and (b) the evaluation of highlighter-resisting property were prepared in the following manner.

Preparation of Evaluation Samples

The treatment solutions 1-104 used in the examples and comparative examples were each spread uniformly on a plain recording paper (plain paper sheet; "4200" produced by Xerox Corporation) with a bar coater (Bar Coater, Rod No. 0 produced by Yasuda Seiki Seisakusho, Ltd.). The coating amount of the treatment solution was 0.9 mg/cm$^3$. Next, a digital multifunction machine DCP-330C provided with an ink-jet printer produced by Brother Industries, Ltd. was used to record a single-color black patch with the water-based ink for ink-jet recording on the recording plain paper sheets, on each of which one of the treatment solutions had been spread, at a resolution of 600 dpi×600 dpi, and evaluation samples were prepared.

(a) Evaluation of Optical Density (OD Value) of Recorded Image

After one day from the sample preparation, the optical density (OD value) of each of the evaluation samples at five locations (five portions) of each evaluation sample was measured by using a spectrophotometric colorimetry meter SpectroEye (light source: $D_{50}$; field: 2°; density: ANSI T; reference white: Abs) produced by Gretag Macbeth, and evaluations were made for the evaluation samples based on the following evaluation criterion.

Evaluation Criterion of Optical Density (OD Value) of Recorded Image

G: The average optical density (OD value) was not less than 1.30.

NG: The average optical density (OD value) was less than 1.30.

(b) Evaluation of Highlighter-Resisting Property

After one day from the sample preparation, a text portion (letter portion) of each of the evaluation samples was traced by a highlighter-pen with a fluorescent color twice at the load of 1N. Blurring of the text and dirtiness at the tip of the pen were visually observed, and evaluations were made for the evaluation samples based on the following evaluation criterion.

Evaluation Criterion of Highlighter-Resisting Property

AA: No flowing of the ink from the letter was observed.

A: Flowing of the ink from the letter was slightly observed.

C: Flowing of the ink from the letter was conspicuously observed.

(c) Evaluation of after-Evaporation Fluidity 5 g of the treatment solution of each of Examples 1-61 and Comparative Examples 1-43 was poured into a open vial (opening size (diameter): 20.2 mm). The open vial was stored in a thermostatic chamber for 5 days at a temperature of 60 degrees Celsius and a relative humidity of 40%. After the storage, the state of the treatment solution in the open vial was visually observed, and evaluations were made for the treatment solutions based on the following evaluation criterion.

Evaluation Criterion of after-Evaporation Fluidity

AA: Fluidity was confirmed (the treatment solution was moved when the open vial was inclined).

A: Fluidity was confirmed (the treatment solution was moved when being applied with impact).

C: Fluidity was not confirmed (the treatment solution was not moved even when the open vial was inclined and was applied with impact).

The composition of the treatment solution of each of Examples 1-61 and Comparative Examples 1-43 and the evaluation results therefor are shown in TABLES 2 to 10. Note that in TABLE 2, the evaluation results of (a) the optical density (OD value) of recorded image and (b) the highlighter-resisting property which were obtained by using only the water-based ink for ink-jet recording, but without applying the treatment solution on the plain paper, is indicated as "Reference".

Note that in TABLES 2 and 3:
  *1: Non-neutralized product of polyallylamine (weight-average molecular weight: 3,000; produced by Nitto Boseki Co., Ltd.; active ingredient amount=20% by weight (parenthesized numerals indicate active ingredient amounts).
  *2: polyamidepolyamine-epichlorohydrin copolymer (viscosity at active ingredient amount of 25% by weight: 62 mPa-second); produced by Toho Chemical Industry, Co., Ltd.; active ingredient amount=30% by weight (parenthesized numerals indicate active ingredient amounts).
  *3: Produced by Kao Corporation.
  *4: nonionic surfactant; produced by Kao Note that in TABLE 4:
  *5: Non-neutralized product of polyallylamine (weight-average molecular weight: 8,000; produced by Nitto Boseki Co., Ltd.; active ingredient amount=15% by weight (parenthesized numerals indicate active ingredient amounts).
  *6: Non-neutralized product of polyallylamine (weight-average molecular weight: 1,000; produced by Nitto Boseki Co., Ltd.; active ingredient amount=15% by weight (parenthesized numerals indicate active ingredient amounts).
  *2: polyamidepolyamine-epichlorohydrin copolymer (viscosity at active ingredient amount of 25% by weight: 62 mPa-second); produced by Toho Chemical Industry, Co., Ltd.; active ingredient amount=30% by weight (parenthesized numerals indicate active ingredient amounts).
  *3: Produced by Kao Corporation.
  *4: nonionic surfactant; produced by Kao Note that in TABLE 5:
  *1: Non-neutralized product of polyallylamine (weight-average molecular weight: 3,000; produced by Nitto Boseki Co., Ltd.; active ingredient amount=20% by weight (parenthesized numerals indicate active ingredient amounts).
  *6: Non-neutralized product of polyallylamine (weight-average molecular weight: 1,000; produced by Nitto Boseki Co., Ltd.; active ingredient amount=15% by weight (parenthesized numerals indicate active ingredient amounts).
  *7: polyamidepolyamine-epichlorohydrin copolymer (viscosity at active ingredient amount of 25% by weight: 108.5 mPa-second); produced by Toho Chemical Industry, Co., Ltd.; active ingredient amount=25% by weight (parenthesized numerals indicate active ingredient amounts).
  *3: Produced by Kao Corporation.
  *4: nonionic surfactant; produced by Kao Note that in TABLE 6:
  *1: Non-neutralized product of polyallylamine (weight-average molecular weight: 3,000; produced by Nitto Boseki Co., Ltd.; active ingredient amount=20% by weight (parenthesized numerals indicate active ingredient amounts).
*6: Non-neutralized product of polyallylamine (weight-average molecular weight: 1,000; produced by Nitto Boseki Co., Ltd.; active ingredient amount=15% by weight (parenthesized numerals indicate active ingredient amounts).
*8: polyamidepolyamine-epichlorohydrin copolymer (viscosity at active ingredient amount of 25% by weight: 79 mPa-second); produced by Taoka Chemical Co., Ltd.; active ingredient amount=25% by weight (parenthesized numerals indicate active ingredient amounts).
*3: Produced by Kao Corporation.
*4: nonionic surfactant; produced by Kao Note that in TABLE 7:
*1: Non-neutralized product of polyallylamine (weight-average molecular weight: 3,000; produced by Nitto Boseki Co., Ltd.; active ingredient amount=20% by weight (parenthesized numerals indicate active ingredient amounts).
*2: polyamidepolyamine-epichlorohydrin copolymer (viscosity at active ingredient amount of 25% by weight: 62 mPa-second); produced by Toho Chemical Industry, Co., Ltd.; active ingredient amount=30% by weight (parenthesized numerals indicate active ingredient amounts).
*3: Produced by Kao Corporation.
*4: nonionic surfactant; produced by Kao Note that in TABLE 8:
*5: Non-neutralized product of polyallylamine (weight-average molecular weight: 8,000; produced by Nitto Boseki Co., Ltd.; active ingredient amount=15% by weight (parenthesized numerals indicate active ingredient amounts).
*6: Non-neutralized product of polyallylamine (weight-average molecular weight: 1,000; produced by Nitto Boseki Co., Ltd.; active ingredient amount=15% by weight (parenthesized numerals indicate active ingredient amounts).
*2: polyamidepolyamine-epichlorohydrin copolymer (viscosity at active ingredient amount of 25% by weight: 62 mPa-second); produced by Toho Chemical Industry, Co., Ltd.; active ingredient amount=30% by weight (parenthesized numerals indicate active ingredient amounts).
*3: Produced by Kao Corporation.
*4: nonionic surfactant; produced by Kao Note that in TABLE 9:
*1: Non-neutralized product of polyallylamine (weight-average molecular weight: 3,000; produced by Nitto Boseki Co., Ltd.; active ingredient amount=20% by weight (parenthesized numerals indicate active ingredient amounts).
*6: Non-neutralized product of polyallylamine (weight-average molecular weight: 1,000; produced by Nitto Boseki Co., Ltd.; active ingredient amount=15% by weight (parenthesized numerals indicate active ingredient amounts).
*7: polyamidepolyamine-epichlorohydrin copolymer (viscosity at active ingredient amount of 25% by weight: 108.5 mPa-second); produced by Toho Chemical Industry, Co., Ltd.; active ingredient amount=25% by weight (parenthesized numerals indicate active ingredient amounts).
*3: Produced by Kao Corporation.
*4: nonionic surfactant; produced by Kao Note that in TABLE 10:
*1: Non-neutralized product of polyallylamine (weight-average molecular weight: 3,000; produced by Nitto Boseki Co., Ltd.; active ingredient amount=20% by weight (parenthesized numerals indicate active ingredient amounts).
*6: Non-neutralized product of polyallylamine (weight-average molecular weight: 1,000; produced by Nitto Boseki Co., Ltd.; active ingredient amount=15% by weight (parenthesized numerals indicate active ingredient amounts).
*8: polyamidepolyamine-epichlorohydrin copolymer (viscosity at active ingredient amount of 25% by weight: 79 mPa-second); produced by Taoka Chemical Co., Ltd.; active ingredient amount=25% by weight (parenthesized numerals indicate active ingredient amounts).
*3: Produced by Kao Corporation.
*4: nonionic surfactant; produced by Kao

TABLE 2

|  |  |  | EXAMPLES | | | | | | |
|---|---|---|---|---|---|---|---|---|---|
|  |  |  | EX. 1 | EX. 2 | EX. 3 | EX. 4 | EX. 5 | EX. 6 | EX. 7 |
| | Treatment solution | | 1 | 2 | 3 | 4 | 5 | 6 | 7 |
| Composition of Treatment Solution (% by weight) | PAA (trade name)-03 (*1) | | 2.5 (0.5) | 40.0 (8.0) | 20.0 (4.0) | 50.0 (10.0) | 50.0 (10.0) | 2.5 (0.5) | 50.0 (10.0) |
| | SUPARAMIN (trade name) C-305 (*2) | | 1.0 (0.3) | 1.0 (0.3) | 3.3 (1.0) | 4.0 (1.2) | 4.3 (1.3) | 4.7 (1.4) | 4.7 (1.4) |
| | Dipropylene glycol-n-propyl ether | | 1.0 | 1.0 | 1.0 | 1.0 | 1.0 | 1.0 | 1.0 |
| | Glycerol (85% by weight concentration) (*3) | | 8.0 | 8.0 | 8.0 | 8.0 | 8.0 | 8.0 | 8.0 |
| | Polyethylene glycol 200 | | 7.0 | 7.0 | 7.0 | 7.0 | 7.0 | 7.0 | 7.0 |
| | MYDOL (trade name) 10 (*4) | | 1.0 | 1.0 | 1.0 | 1.0 | 1.0 | 1.0 | 1.0 |
| | Acetic acid | | 2.0 | 2.0 | 2.0 | 2.0 | 2.0 | 2.0 | 2.0 |
| | Water | | balance | balance | balance | balance | balance | balance | balance |
| Evaluation | Optical density (OD value) of recorded image | | 1.32 G | 1.32 G | 1.38 G | 1.35 G | 1.36 G | 1.30 G | 1.37 G |
| | Highlighter-resisting property | Letter | AA | AA | AA | AA | AA | AA | AA |
| | | Pen tip | AA | AA | AA | AA | AA | AA | AA |
| | After-evaporation fluidity | | AA | AA | AA | AA | AA | AA | AA |

TABLE 2-continued

|  |  | EXAMPLES |  |  |  |  |  |  |
|---|---|---|---|---|---|---|---|---|
|  |  | EX. 8 | EX. 9 | EX. 10 | EX. 11 | EX. 12 | EX. 13 | Reference |
| Composition of Treatment Solution (% by weight) | Treatment solution | 8 | 9 | 10 | 11 | 12 | 13 | none |
|  | PAA (trade name)-03 (*1) | 2.5 (0.5) | 15.0 (3.0) | 30.0 (6.0) | 35.0 (7.0) | 45.0 (9.0) | 50.0 (10.0) | — |
|  | SUPARAMIN (trade name) C-305 (*2) | 5.0 (1.5) | 5.0 (1.5) | 5.0 (1.5) | 5.0 (1.5) | 5.0 (1.5) | 5.0 (1.5) | — |
|  | Dipropylene glycol-n-propyl ether | 1.0 | 1.0 | 1.0 | 1.0 | 1.0 | 1.0 | — |
|  | Glycerol (85% by weight concentration) (*3) | 8.0 | 8.0 | 8.0 | 8.0 | 8.0 | 8.0 | — |
|  | Polyethylene glycol 200 | 7.0 | 7.0 | 7.0 | 7.0 | 7.0 | 7.0 | — |
|  | MYDOL (trade name) 10 (*4) | 1.0 | 1.0 | 1.0 | 1.0 | 1.0 | 1.0 | — |
|  | Acetic acid | 2.0 | 2.0 | 2.0 | 2.0 | 2.0 | 2.0 | — |
|  | Water | balance | balance | balance | balance | balance | balance | — |
| Evaluation | Optical density (OD value) of recorded image | 1.37 G | 1.39 G | 1.35 G | 1.37 G | 1.36 G | 1.35 G | 1.11 NG |
|  | Highlighter-resisting property — Letter | AA | AA | AA | AA | AA | AA | AA |
|  | Highlighter-resisting property — Pen tip | AA | AA | AA | AA | AA | AA | AA |
|  | After-evaporation fluidity | AA | AA | AA | AA | AA | AA | — |

TABLE 3

|  |  | EXAMPLES |  |  |  |  |  |  |
|---|---|---|---|---|---|---|---|---|
|  |  | EX. 14 | EX. 15 | EX. 16 | EX. 17 | EX. 18 | EX. 19 | EX. 20 |
| Composition of Treatment Solution (% by weight) | Treatment solution | 14 | 15 | 16 | 17 | 18 | 19 | 20 |
|  | PAA (trade name)-03 (*1) | 5.0 (1.0) | 7.5 (1.5) | 15.0 (3.0) | 15.0 (3.0) | 2.5 (0.5) | 5.0 (1.0) | 7.5 (1.5) |
|  | SUPARAMIN (trade name) C-305 (*2) | 1.0 (0.3) | 1.0 (0.3) | 1.0 (0.3) | 1.33 (0.4) | 1.66 (0.5) | 1.66 (0.5) | 1.66 (0.5) |
|  | Dipropylene glycol-n-propyl ether | 1.0 | 1.0 | 1.0 | 1.0 | 1.0 | 1.0 | 1.0 |
|  | Glycerol (85% by weight concentration) (*3) | 8.0 | 8.0 | 8.0 | 8.0 | 8.0 | 8.0 | 8.0 |
|  | Polyethylene glycol 200 | 7.0 | 7.0 | 7.0 | 7.0 | 7.0 | 7.0 | 7.0 |
|  | MYDOL (trade name) 10 (*4) | 1.0 | 1.0 | 1.0 | 1.0 | 1.0 | 1.0 | 1.0 |
|  | Acetic acid | 2.0 | 2.0 | 2.0 | 2.0 | 2.0 | 2.0 | 2.0 |
|  | Water | balance | balance | balance | balance | balance | balance | balance |
| Evaluation | Optical density (OD value) of recorded image | 1.30 G | 1.32 G | 1.35 G | 1.36 G | 1.32 G | 1.35 G | 1.35 G |
|  | Highlighter-resisting property — Letter | AA | AA | AA | AA | AA | AA | AA |
|  | Highlighter-resisting property — Pen tip | AA | AA | AA | AA | AA | AA | AA |
|  | After-evaporation fluidity | AA | AA | AA | AA | AA | AA | AA |

|  |  | EXAMPLES |  |  |  |  |  |  |  |
|---|---|---|---|---|---|---|---|---|---|
|  |  | EX. 21 | EX. 22 | EX. 23 | EX. 24 | EX. 25 | EX. 26 | EX. 27 | EX. 28 |
| Composition of Treatment Solution (% by weight) | Treatment solution | 21 | 22 | 23 | 24 | 25 | 26 | 27 | 28 |
|  | PAA (trade name)-03 (*1) | 10.0 (2.0) | 15.0 (3.0) | 25.0 (5.0) | 2.5 (0.5) | 15.0 (3.0) | 20.0 (40) | 35.0 (7.0) | 45.0 (9.0) |
|  | SUPARAMIN (trade name) C-305 (*2) | 1.66 (0.5) | 1.66 (0.5) | 1.66 (0.5) | 3.3 (1.0) | 3.3 (1.0) | 3.3 (1.0) | 3.3 (1.0) | 3.3 (1.0) |
|  | Dipropylene glycol-n-propyl ether | 1.0 | 1.0 | 1.0 | 1.0 | 1.0 | 1.0 | 1.0 | 1.0 |
|  | Glycerol (85% by weight concentration) (*3) | 8.0 | 8.0 | 8.0 | 8.0 | 8.0 | 8.0 | 8.0 | 8.0 |
|  | Polyethylene glycol 200 | 7.0 | 7.0 | 7.0 | 7.0 | 7.0 | 7.0 | 7.0 | 7.0 |
|  | MYDOL (trade name) 10 (*4) | 1.0 | 1.0 | 1.0 | 1.0 | 1.0 | 1.0 | 1.0 | 1.0 |
|  | Acetic acid | 2.0 | 2.0 | 2.0 | 2.0 | 2.0 | 2.0 | 2.0 | 2.0 |
|  | Water | balance | balance | balance | balance | balance | balance | balance | balance |
| Evaluation | Optical density (OD value) of recorded image | 1.40 G | 1.40 G | 1.38 G | 1.37 G | 1.36 G | 1.38 G | 1.35 G | 1.35 G |
|  | Highlighter-resisting property — Letter | AA | AA | AA | AA | AA | AA | AA | AA |
|  | Highlighter-resisting property — Pen tip | AA | AA | AA | AA | AA | AA | AA | AA |
|  | After-evaporation fluidity | AA | AA | AA | AA | AA | AA | AA | AA |

TABLE 4

|  |  | EXAMPLES |  |  |  |  |
|---|---|---|---|---|---|---|
|  |  | EX. 29 | EX. 30 | EX. 31 | EX. 32 | EX. 33 |
| Composition of Treatment Solution | Treatment solution | 29 | 30 | 31 | 32 | 33 |
|  | PAA (trade name)-08 (*5) | 3.3 (0.5) | 53.3 (8.0) | 66.7 (10.0) | — | — |

TABLE 4-continued

|  |  |  |  |  |  |  |
|---|---|---|---|---|---|---|
| (% by weight) | PAA (trade name)-01 (*6) | — | — | — | 3.3 (0.5) | 53.3 (8.0) |
|  | SUPARAMIN (trade name) C-305 (*2) | 1.0 (0.3) | 1.0 (0.3) | 1.0 (0.3) | 1.0 (0.3) | 1.0 (0.3) |
|  | Dipropylene glycol-n-propyl ether | 1.0 | 1.0 | 1.0 | 1.0 | 1.0 |
|  | Glycerol (85% by weight concentration) (*3) | 8.0 | 8.0 | 8.0 | 8.0 | 8.0 |
|  | Polyethylene glycol 200 | 7.0 | 7.0 | 7.0 | 7.0 | 7.0 |
|  | MYDOL (trade name) 10 (*4) | 1.0 | 1.0 | 1.0 | 1.0 | 1.0 |
|  | Acetic acid | 2.0 | 2.0 | 2.0 | 2.0 | 2.0 |
|  | Water | balance | balance | balance | balance | balance |
| Evaluation | Optical density (OD value) of recorded image | 1.30 G | 1.32 G | 1.32 G | 1.31 G | 1.35 G |
|  | Highlighter-resisting property — Letter | A | AA | AA | AA | AA |
|  | Highlighter-resisting property — Pen tip | A | AA | AA | AA | AA |
|  | After-evaporation fluidity | AA | AA | AA | AA | AA |

|  |  | EXAMPLES | | | | |
|---|---|---|---|---|---|---|
|  |  | EX. 34 | EX. 35 | EX. 36 | EX. 37 | EX. 38 |
| Composition of Treatment Solution (% by weight) | Treatment solution | 34 | 35 | 36 | 37 | 38 |
|  | PAA (trade name)-08 (*5) | — | — | — | — | — |
|  | PAA (trade name)-01 (*6) | 66.7 (10.0) | 26.7 (4.0) | 3.3 (0.5) | 66.7 (10.0) | 40.0 (6.0) |
|  | SUPARAMIN (trade name) C-305 (*2) | 1.0 (0.3) | 3.3 (1.0) | 4.7 (1.4) | 4.7 (1.4) | 6.7 (2.0) |
|  | Dipropylene glycol-n-propyl ether | 1.0 | 1.0 | 1.0 | 1.0 | 1.0 |
|  | Glycerol (85% by weight concentration) (*3) | 8.0 | 8.0 | 8.0 | 8.0 | 8.0 |
|  | Polyethylene glycol 200 | 7.0 | 7.0 | 7.0 | 7.0 | 7.0 |
|  | MYDOL (trade name) 10 (*4) | 1.0 | 1.0 | 1.0 | 1.0 | 1.0 |
|  | Acetic acid | 2.0 | 2.0 | 2.0 | 2.0 | 2.0 |
|  | Water | balance | balance | balance | balance | balance |
| Evaluation | Optical density (OD value) of recorded image | 1.33 G | 1.34 G | 1.33 G | 1.34 G | 1.36 G |
|  | Highlighter-resisting property — Letter | AA | AA | AA | AA | AA |
|  | Highlighter-resisting property — Pen tip | AA | AA | AA | AA | AA |
|  | After-evaporation fluidity | AA | AA | AA | AA | AA |

TABLE 5

|  |  | EXAMPLES | | | | | |
|---|---|---|---|---|---|---|---|
|  |  | EX. 39 | EX. 40 | EX. 41 | EX. 42 | EX. 43 | EX. 44 |
| Composition of Treatment Solution (% by weight) | Treatment solution | 39 | 40 | 41 | 42 | 43 | 44 |
|  | PAA (trade name)-03 (*1) | 2.5 (0.5) | 40.0 (8.0) | 20.0 (4.0) | 2.5 (0.5) | 50.0 (10.0) | 2.5 (0.5) |
|  | PAA (trade name)-01 (*6) | — | — | — | — | — | — |
|  | ARAFIX (trade name) 255LOX (*7) | 1.2 (0.3) | 1.2 (0.3) | 4.0 (1.0) | 5.6 (1.4) | 5.6 (1.4) | 6.0 (1.5) |
|  | Dipropylene glycol-n-propyl ether | 1.0 | 1.0 | 1.0 | 1.0 | 1.0 | 1.0 |
|  | Glycerol (85% by weight concentration) (*3) | 8.0 | 8.0 | 8.0 | 8.0 | 8.0 | 8.0 |
|  | Polyethylene glycol 200 | 7.0 | 7.0 | 7.0 | 7.0 | 7.0 | 7.0 |
|  | MYDOL (trade name) 10 (*4) | 1.0 | 1.0 | 1.0 | 1.0 | 1.0 | 1.0 |
|  | Acetic acid | 2.0 | 2.0 | 2.0 | 2.0 | 2.0 | 2.0 |
|  | Water | balance | balance | balance | balance | balance | balance |
| Evaluation | Optical density (OD value) of recorded image | 1.30 G | 1.37 G | 1.36 G | 1.32 G | 1.33 G | 1.30 G |
|  | Highlighter-resisting property — Letter | AA | AA | AA | AA | AA | AA |
|  | Highlighter-resisting property — Pen tip | AA | AA | AA | AA | AA | AA |
|  | After-evaporation fluidity | AA | AA | AA | AA | AA | AA |

|  |  | EXAMPLES | | | | |
|---|---|---|---|---|---|---|
|  |  | EX. 45 | EX. 46 | EX. 47 | EX. 48 | EX. 49 |
| Composition of Treatment Solution (% by weight) | Treatment solution | 45 | 46 | 47 | 48 | 49 |
|  | PAA (trade name)-03 (*1) | — | — | — | — | — |
|  | PAA (trade name)-01 (*6) | 3.3 (0.5) | 66.7 (10.0) | 26.7 (4.0) | 3.3 (0.5) | 40.0 (6.0) |
|  | ARAFIX (trade name) 255LOX (*7) | 1.2 (0.3) | 1.2 (0.3) | 4.0 (1.0) | 5.6 (1.4) | 8.0 (2.0) |
|  | Dipropylene glycol-n-propyl ether | 1.0 | 1.0 | 1.0 | 1.0 | 1.0 |
|  | Glycerol (85% by weight concentration) (*3) | 8.0 | 8.0 | 8.0 | 8.0 | 8.0 |
|  | Polyethylene glycol 200 | 7.0 | 7.0 | 7.0 | 7.0 | 7.0 |
|  | MYDOL (trade name) 10 (*4) | 1.0 | 1.0 | 1.0 | 1.0 | 1.0 |

TABLE 5-continued

|  |  |  | | | | | |
|---|---|---|---|---|---|---|---|
|  | Acetic acid | | 2.0 | 2.0 | 2.0 | 2.0 | 2.0 |
|  | Water | | balance | balance | balance | balance | balance |
| Evaluation | Optical density (OD value) of recorded image | | 1.31 G | 1.34 G | 1.34 G | 1.32 G | 1.32 G |
|  | Highlighter-resisting property | Letter | AA | AA | AA | AA | AA |
|  |  | Pen tip | AA | AA | AA | AA | AA |
|  | After-evaporation fluidity | | AA | AA | AA | AA | AA |

TABLE 6

|  |  | EXAMPLES | | | | | |
|---|---|---|---|---|---|---|---|
|  |  | EX. 50 | EX. 51 | EX. 52 | EX. 53 | EX. 54 | EX. 55 |
| Composition of Treatment Solution (% by weight) | Treatment solution | 50 | 51 | 52 | 53 | 54 | 55 |
|  | PAA (trade name)-03 (*1) | 2.5 (0.5) | 40.0 (8.0) | 20.0 (4.0) | 2.5 (0.5) | 50.0 (10.0) | 2.5 (0.5) |
|  | PAA (trade name)-01 (*6) | — | — | — | — | — | — |
|  | SUMIREZ RESIN (trade name) 675A (*8) | 1.2 (0.3) | 1.2 (0.3) | 4.0 (1.0) | 5.6 (1.4) | 5.6 (1.4) | 6.0 (1.5) |
|  | Dipropylene glycol-n-propyl ether | 1.0 | 1.0 | 1.0 | 1.0 | 1.0 | 1.0 |
|  | Glycerol (85% by weight concentration) (*3) | 8.0 | 8.0 | 8.0 | 8.0 | 8.0 | 8.0 |
|  | Polyethylene glycol 200 | 7.0 | 7.0 | 7.0 | 7.0 | 7.0 | 7.0 |
|  | MYDOL (trade name) 10 (*4) | 1.0 | 1.0 | 1.0 | 1.0 | 1.0 | 1.0 |
|  | Acetic acid | 2.0 | 2.0 | 2.0 | 2.0 | 2.0 | 2.0 |
|  | Water | balance | balance | balance | balance | balance | balance |
| Evaluation | Optical density (OD value) of recorded image | 1.35 G | 1.39 G | 1.38 G | 1.35 G | 1.37 G | 1.37 G |
|  | Highlighter-resisting property Letter | AA | A | AA | AA | AA | AA |
|  | Pen tip | AA | A | AA | AA | AA | A |
|  | After-evaporation fluidity | AA | AA | AA | A | AA | AA |

|  |  | EXAMPLES | | | | | |
|---|---|---|---|---|---|---|---|
|  |  | EX. 56 | EX. 57 | EX. 58 | EX. 59 | EX. 60 | EX. 61 |
| Composition of Treatment Solution (% by weight) | Treatment solution | 56 | 57 | 58 | 59 | 60 | 61 |
|  | PAA (trade name)-03 (*1) | — | — | — | — | — | — |
|  | PAA (trade name)-01 (*6) | 3.3 (0.5) | 66.7 (10.0) | 26.7 (4.0) | 3.3 (0.5) | 66.7 (10.0) | 40.0 (6.0) |
|  | SUMIREZ RESIN (trade name) 675A (*8) | 1.2 (0.3) | 1.2 (0.3) | 4.0 (1.0) | 5.6 (1.4) | 5.6 (1.4) | 8.0 (2.0) |
|  | Dipropylene glycol-n-propyl ether | 1.0 | 1.0 | 1.0 | 1.0 | 1.0 | 1.0 |
|  | Glycerol (85% by weight concentration) (*3) | 8.0 | 8.0 | 8.0 | 8.0 | 8.0 | 8.0 |
|  | Polyethylene glycol 200 | 7.0 | 7.0 | 7.0 | 7.0 | 7.0 | 7.0 |
|  | MYDOL (trade name) 10 (*4) | 1.0 | 1.0 | 1.0 | 1.0 | 1.0 | 1.0 |
|  | Acetic acid | 2.0 | 2.0 | 2.0 | 2.0 | 2.0 | 2.0 |
|  | Water | balance | balance | balance | balance | balance | balance |
| Evaluation | Optical density (OD value) of recorded image | 1.34 G | 1.36 G | 1.35 G | 1.33 G | 1.36 G | 1.35 G |
|  | Highlighter-resisting property Letter | AA | AA | AA | AA | AA | AA |
|  | Pen tip | AA | AA | AA | AA | AA | AA |
|  | After-evaporation fluidity | AA | AA | AA | AA | AA | AA |

TABLE 7

|  |  | Comparative Examples | | | | | | |
|---|---|---|---|---|---|---|---|---|
|  |  | COM EX. 1 | COM EX. 2 | COM EX. 3 | COM EX. 4 | COM EX. 5 | COM EX. 6 | COM EX. 7 |
| Composition of Treatment Solution (% by weight) | Treatment solution | 62 | 63 | 64 | 65 | 66 | 67 | 68 |
|  | PAA (trade name)-03 (*1) | — | — | — | 5.0 (1.0) | 15.0 (3.0) | 25.0 (5.0) | 15.0 (3.0) |
|  | SUPARAMIN (trade name) C-305 (*2) | 3.3 (1.0) | 10.0 (3.0) | 16.7 (5.0) | — | — | — | 0.33 (0.1) |
|  | Dipropylene glycol-n-propyl ether | 1.0 | 1.0 | 1.0 | 1.0 | 1.0 | 1.0 | 1.0 |
|  | Glycerol (85% by weight concentration) (*3) | 8.0 | 8.0 | 8.0 | 8.0 | 8.0 | 8.0 | 8.0 |
|  | Polyethylene glycol 200 | 7.0 | 7.0 | 7.0 | 7.0 | 7.0 | 7.0 | 7.0 |
|  | MYDOL (trade name) 10 (*4) | 1.0 | 1.0 | 1.0 | 1.0 | 1.0 | 1.0 | 1.0 |

TABLE 7-continued

|  |  |  |  |  |  |  |  |  |  |
|---|---|---|---|---|---|---|---|---|---|
|  | Acetic acid |  | — | — | — | 2.0 | 2.0 | 2.0 | 2.0 |
|  | Water |  | balance | balance | balance | balance | balance | balance | balance |
| Evaluation | Optical density (OD value) of recorded image |  | 1.20 | 1.22 | 1.33 | 1.20 | 1.35 | 1.34 | 1.35 |
|  |  |  | NG | NG | G | NG | G | G | G |
|  | Highlighter-resisting | Letter | AA | AA | AA | AA | C | C | C |
|  | property | Pen tip | AA | AA | AA | AA | C | C | C |
|  | After-evaporation fluidity |  | AA | AA | C | AA | AA | AA | AA |

|  |  |  | Comparative Examples ||||||||
|---|---|---|---|---|---|---|---|---|---|---|
|  |  |  | COM EX. 8 | COM EX. 9 | COM EX. 10 | COM EX. 11 | COM EX. 12 | COM EX. 13 | COM EX. 14 | COM EX. 15 |
|  | Treatment solution |  | 69 | 70 | 71 | 72 | 73 | 74 | 75 | 76 |
| Composition of Treatment Solution (% by weight) | PAA (trade name)-03 (*1) |  | 15.0 (3.0) | 60.0 (12.0) | 80.0 (16.0) | 60.0 (12.0) | 65.0 (13.0) | 75.0 (15.0) | 65.0 (13.0) | 15.0 (3.0) |
|  | SUPARAMIN (trade name) C-305 (*2) |  | 0.66 (0.2) | 1.0 (0.3) | 1.0 (0.3) | 3.3 (1.0) | 3.3 (1.0) | 3.3 (1.0) | 6.6 (2.0) | 10.0 (3.0) |
|  | Dipropylene glycol-n-propyl ether |  | 1.0 | 1.0 | 1.0 | 1.0 | 1.0 | 1.0 | 1.0 | 1.0 |
|  | Glycerol (85% by weight concentration) (*3) |  | 8.0 | 8.0 | 8.0 | 8.0 | 8.0 | 8.0 | 8.0 | 8.0 |
|  | Polyethylene glycol 200 |  | 7.0 | 7.0 | 7.0 | 7.0 | 7.0 | 7.0 | 7.0 | 7.0 |
|  | MYDOL (trade name) 10 (*4) |  | 1.0 | 1.0 | 1.0 | 1.0 | 1.0 | 1.0 | 1.0 | 1.0 |
|  | Acetic acid |  | 2.0 | 2.0 | 2.0 | 2.0 | 2.0 | 2.0 | 2.0 | 2.0 |
|  | Water |  | balance | balance | balance | balance | balance | balance | balance | balance |
| Evaluation | Optical density (OD value) of recorded image |  | 1.35 G | 1.33 G | 1.30 G | 1.33 G | 1.32 G | 1.38 G | 1.33 G | 1.35 G |
|  | Highlighter-resisting | Letter | C | C | C | C | C | C | C | AA |
|  | property | Pen tip | C | C | C | C | C | C | C | AA |
|  | After-evaporation fluidity | AA | C | C | C | C | C | C | C |  |

TABLE 8

|  |  | Comparative Examples |||||
|---|---|---|---|---|---|---|
|  |  | COM EX. 16 | COM EX. 17 | COM EX. 18 | COM EX. 19 | COM EX. 20 |
|  | Treatment solution | 77 | 78 | 79 | 80 | 81 |
| Composition of Treatment Solution (% by weight) | PAA (trade name)-08 (*5) | 6.7 (1.0) | 20.0 (3.0) | 33.3 (5.0) | — | — |
|  | PAA (trade name)-01 (*6) | — | — | — | 3.3 (0.5) | 66.7 (10.0) |
|  | SUPARAMIN (trade name) C-305 (*2) | — | — | — | 8.3 (2.5) | 8.3 (2.5) |
|  | Dipropylene glycol-n-propyl ether | 1.0 | 1.0 | 1.0 | 1.0 | 1.0 |
|  | Glycerol (85% by weight concentration) (*3) | 8.0 | 8.0 | 8.0 | 8.0 | 8.0 |
|  | Polyethylene glycol 200 | 7.0 | 7.0 | 7.0 | 7.0 | 7.0 |
|  | MYDOL (trade name) 10 (*4) | 1.0 | 1.0 | 1.0 | 1.0 | 1.0 |
|  | Acetic acid | 2.0 | 2.0 | 2.0 | 2.0 | 2.0 |
|  | Water | balance | balance | balance | balance | balance |
| Evaluation | Optical density (OD value) of recorded image | 1.25 NG | 1.33 G | 1.35 G | 1.35 G | 1.36 G |
|  | Highlighter-resisting   Letter | C | C | C | AA | AA |
|  | property                 Pen tip | C | C | C | AA | AA |
|  | After-evaporation fluidity | AA | AA | AA | C | C |

|  |  | Comparative Examples |||||
|---|---|---|---|---|---|---|
|  |  | COM EX. 21 | COM EX. 22 | COM EX. 23 | COM EX. 24 | COM EX. 25 |
|  | Treatment solution | 82 | 83 | 84 | 85 | 86 |
| Composition of Treatment Solution (% by weight) | PAA (trade name)-08 (*5) | — | — | — | — | — |
|  | PAA (trade name)-01 (*6) | 3.3 (0.5) | 66.7 (10.0) | 6.7 (1.0) | 20.0 (3.0) | 33.3 (5.0) |
|  | SUPARAMIN (trade name) C-305 (*2) | 10.0 (3.0) | 10.0 (3.0) | — | — | — |
|  | Dipropylene glycol-n-propyl ether | 1.0 | 1.0 | 1.0 | 1.0 | 1.0 |
|  | Glycerol (85% by weight concentration) (*3) | 8.0 | 8.0 | 8.0 | 8.0 | 8.0 |
|  | Polyethylene glycol 200 | 7.0 | 7.0 | 7.0 | 7.0 | 7.0 |
|  | MYDOL (trade name) 10 (*4) | 1.0 | 1.0 | 1.0 | 1.0 | 1.0 |
|  | Acetic acid | 2.0 | 2.0 | 2.0 | 2.0 | 2.0 |
|  | Water | balance | balance | balance | balance | balance |
| Evaluation | Optical density (OD value) of recorded image | 1.35 G | 1.37 G | 1.19 NG | 1.32 G | 1.36 G |

TABLE 8-continued

|  |  |  | | | | | |
|---|---|---|---|---|---|---|---|
| | Highlighter-resisting property | Letter | AA | AA | C | C | C |
| | | Pen tip | AA | AA | C | C | C |
| | After-evaporation fluidity | | C | C | AA | AA | AA |

TABLE 9

| | | Comparative Examples | | | | |
|---|---|---|---|---|---|---|
| | | COM EX. 26 | COM EX. 27 | COM EX. 28 | COM EX. 29 | COM EX. 30 |
| | Treatment solution | 87 | 88 | 89 | 90 | 91 |
| Composition of Treatment Solution (% by weight) | PAA (trade name)-03 (*1) | 60.0 | 60.0 (12.0) | — (12.0) | — | — |
| | PAA (trade name)-01 (*6) | — | — | — | — | — |
| | ARAFIX (trade name) 255LOX (*7) | 5.6 (1.4) | 6.0 (1.5) | 4.0 (1.0) | 12.0 (3.0) | 20.0 (5.0) |
| | Dipropylene glycol-n-propyl ether | 1.0 | 1.0 | 1.0 | 1.0 | 1.0 |
| | Glycerol (85% by weight concentration) (*3) | 8.0 | 8.0 | 8.0 | 8.0 | 8.0 |
| | Polyethylene glycol 200 | 7.0 | 7.0 | 7.0 | 7.0 | 7.0 |
| | MYDOL (trade name) 10 (*4) | 1.0 | 1.0 | 1.0 | 1.0 | 1.0 |
| | Acetic acid | 2.0 | 2.0 | — | — | — |
| | Water | balance | balance | balance | balance | balance |
| Evaluation | Optical density (OD value) of recorded image | 1.33 G | 1.34 G | 1.23 NG | 1.30 G | 1.33 G |
| | Highlighter-resisting property | Letter | C | C | AA | AA | AA |
| | | Pen tip | C | C | AA | AA | AA |
| | After-evaporation fluidity | C | C | AA | C | C |

| | | Comparative Examples | | | |
|---|---|---|---|---|---|
| | | COM EX. 31 | COM EX. 32 | COM EX. 33 | COM EX. 34 |
| | Treatment solution | 92 | 93 | 94 | 95 |
| Composition of Treatment Solution (% by weight) | PAA (trade name)-03 (*1) | — | — | — | — |
| | PAA (trade name)-01 (*6) | 3.3 (0.5) | 66.7 (10.0) | 12.0 (3.0) | 66.7 (10.0) |
| | ARAFIX (trade name) 255LOX (*7) | 10.0 (2.5) | 10.0 (2.5) | 12.0 (3.0) | 12.0 (3.0) |
| | Dipropylene glycol-n-propyl ether | 1.0 | 1.0 | 1.0 | 1.0 |
| | Glycerol (85% by weight concentration) (*3) | 8.0 | 8.0 | 8.0 | 8.0 |
| | Polyethylene glycol 200 | 7.0 | 7.0 | 7.0 | 7.0 |
| | MYDOL (trade name) 10 (*4) | 1.0 | 1.0 | 1.0 | 1.0 |
| | Acetic acid | 2.0 | 2.0 | 2.0 | 2.0 |
| | Water | balance | balance | balance | balance |
| Evaluation | Optical density (OD value) of recorded image | 1.36 G | 1.35 G | 1.34 G | 1.35 G |
| | Highlighter-resisting property | Letter | AA | AA | AA | AA |
| | | Pen tip | AA | AA | AA | AA |
| | After-evaporation fluidity | C | C | C | C |

TABLE 10

| | | Comparative Examples | | | | |
|---|---|---|---|---|---|---|
| | | COM EX. 35 | COM EX. 36 | COM EX. 37 | COM EX. 38 | COM EX. 39 |
| | Treatment solution | 96 | 97 | 98 | 99 | 100 |
| Composition of Treatment Solution (% by weight) | PAA (trade name)-03 (*1) | 60.0 (12.0) | 60.0 (12.0) | — | — | — |
| | PAA (trade name)-01 (*6) | — | — | — | — | — |
| | SUMIREZ RESIN (trade name) 675A (*8) | 5.6 (1.4) | 6.0 (1.5) | 4.0 (1.0) | 12.0 (3.0) | 20.0 (5.0) |
| | Dipropylene glycol-n-propyl ether | 1.0 | 1.0 | 1.0 | 1.0 | 1.0 |
| | Glycerol (85% by weight concentration) (*3) | 8.0 | 8.0 | 8.0 | 8.0 | 8.0 |
| | Polyethylene glycol 200 | 7.0 | 7.0 | 7.0 | 7.0 | 7.0 |
| | MYDOL (trade name) 10 (*4) | 1.0 | 1.0 | 1.0 | 1.0 | 1.0 |
| | Acetic acid | 2.0 | 2.0 | — | — | — |
| | Water | balance | balance | balance | balance | balance |

TABLE 10-continued

| Evaluation | Optical density (OD value) of recorded image | | 1.38 | 1.38 | 1.25 | 1.28 | 1.33 |
|---|---|---|---|---|---|---|---|
| | | | G | G | NG | NG | G |
| | Highlighter-resisting property | Letter | C | C | AA | AA | AA |
| | | Pen tip | C | C | AA | AA | AA |
| | After-evaporation fluidity | | AA | C | AA | C | C |

| | | | Comparative Examples | | | |
|---|---|---|---|---|---|---|
| | | | COM EX. 40 | COM EX. 41 | COM EX. 42 | COM EX. 43 |
| Composition of Treatment Solution (% by weight) | Treatment solution | | 101 | 102 | 103 | 104 |
| | PAA (trade name)-03 (*1) | | — | — | — | — |
| | PAA (trade name)-01 (*6) | | 3.3 | 66.7 | 16.7 | 66.7 |
| | | | (0.5) | (10.0) | (2.5) | (10.0) |
| | SUMIREZ RESIN (trade name) 675A (*8) | | 10.0 | 10.0 | 12.0 | 12.0 |
| | | | (2.5) | (2.5) | (3.0) | (3.0) |
| | Dipropylene glycol-n-propyl ether | | 1.0 | 1.0 | 1.0 | 1.0 |
| | Glycerol (85% by weight concentration) (*3) | | 8.0 | 8.0 | 8.0 | 8.0 |
| | Polyethylene glycol 200 | | 7.0 | 7.0 | 7.0 | 7.0 |
| | MYDOL (trade name) 10 (*4) | | 1.0 | 1.0 | 1.0 | 1.0 |
| | Acetic acid | | 2.0 | 2.0 | 2.0 | 2.0 |
| | Water | | balance | balance | balance | balance |
| Evaluation | Optical density (OD value) of recorded image | | 1.34 | 1.35 | 1.35 | 1.37 |
| | | | G | G | G | G |
| | Highlighter-resisting property | Letter | AA | AA | AA | AA |
| | | Pen tip | AA | AA | AA | AA |
| | After-evaporation fluidity | | C | C | C | C |

As shown in TABLEs 2-6, in each of Examples 1-61, the evaluation of optical density (OD value) of the recorded image, the evaluation of highlighter-resisting property, and the evaluation of after-evaporation fluidity had all satisfactory results.

On the other hand, as shown in TABLEs 7-10, in Comparative Example 35 in which the blending amount (active-ingredient amount conversion) of the component (A) with respect to the total amount of the treatment solution exceeded 10% by weight, the evaluation of highlighter-resisting property was inferior. Similarly, in each of Comparative Examples 9-14, 26, 27 and 36 in which the blending amount (active-ingredient amount conversion) of the component (A) with respect to the total amount of the treatment solution exceeded 10% by weight, the evaluation result of highlighter-resisting property and the evaluation result of after-evaporation fluidity as well were inferior.

Further, in each of Comparative Examples 1, 2, 27, 37 and 38 in which the blending amount (active-ingredient amount conversion) of the component (A) with respect to the total amount of the treatment solution was less than 0.5% by weight, the evaluation of optical density (OD value) of the recorded image was inferior. On the other hand, in each of Comparative Examples 3, 29, 30 and 39 in which although the blending amount (active-ingredient amount conversion) of the component (A) with respect to the total amount of the treatment solution was less than 0.5% by weight, the evaluation of optical density (OD value) of the recorded image had a satisfactory evaluation result of "G". In each of Comparative Examples 3, 29, 30 and 39, the blending amount of the component (B) exceeded 2% by weight, and thus it is considered that the optical density was improved by the pigment-aggregating function of the component (B). However, in each of Comparative Examples 3, 29, 30 and 39, the after-evaporation fluidity had an inferior evaluation result of "C" since the blending amount of the component (B) exceeded 2% by weight.

Furthermore, in each of Comparative Examples 3, 15, 19-22, 29-34 and 38-43 in which the blending amount (active-ingredient amount conversion) of the component (B) with respect to the total amount of the treatment solution exceeded 2% by weight, the evaluation result of after-evaporation fluidity was inferior. On the other hand, in Comparative Example 2 in which although the blending amount (active-ingredient amount conversion) of the component (B) with respect to the total amount of the treatment solution exceeded 2% by weight, the evaluation result of after-evaporation fluidity had a satisfactory evaluation result of "AA". It is assumed that the after-evaporation fluidity was improved in Comparative Example 2 since Comparative Example 2 did not contain the component (A), and thus was not affected by the component (A) at all. In Comparative Example 2, however, the evaluation of the optical density had an inferior result of "NG" since the blending amount (active-ingredient amount conversion) of the component (A) with respect to the total amount of the treatment solution was less than 0.5% by weight.

Moreover, in Comparative Example 4 in which the blending amount (active-ingredient amount conversion) of the component (B) with respect to the total amount of the treatment solution was less than 0.3% by weight, the evaluation result of optical density (OD value) of the recorded image was inferior. Similarly, in each of Comparative Examples 5-8, 17, 18, 24 and 25 in which the blending amount (active-ingredient amount conversion) of the component (B) with respect to the total amount of the treatment solution was less than 0.3% by weight, the evaluation result of highlighter-resisting property was inferior. Similarly, in each of Comparative Examples 16 and 23 in which the blending amount (active-ingredient amount conversion) of the component (B) with respect to the total amount of the treatment solution was less than 0.3% by weight, the evaluation result of optical density (OD value) of the recorded image and the evaluation result of highlighter-resisting property were both inferior.

Further, in Comparative Example 38 in which in which the blending amount (active-ingredient amount conversion) of the component (A) with respect to the total amount of the treatment solution was less than 0.5% by weight and the blending amount (active-ingredient amount conversion) of the component (B) with respect to the total amount of the treatment solution exceeded 2% by weight, the evaluation result of optical density (OD value) of the recorded image was inferior and the evaluation result of after-evaporation fluidity were inferior.

Figure 3:
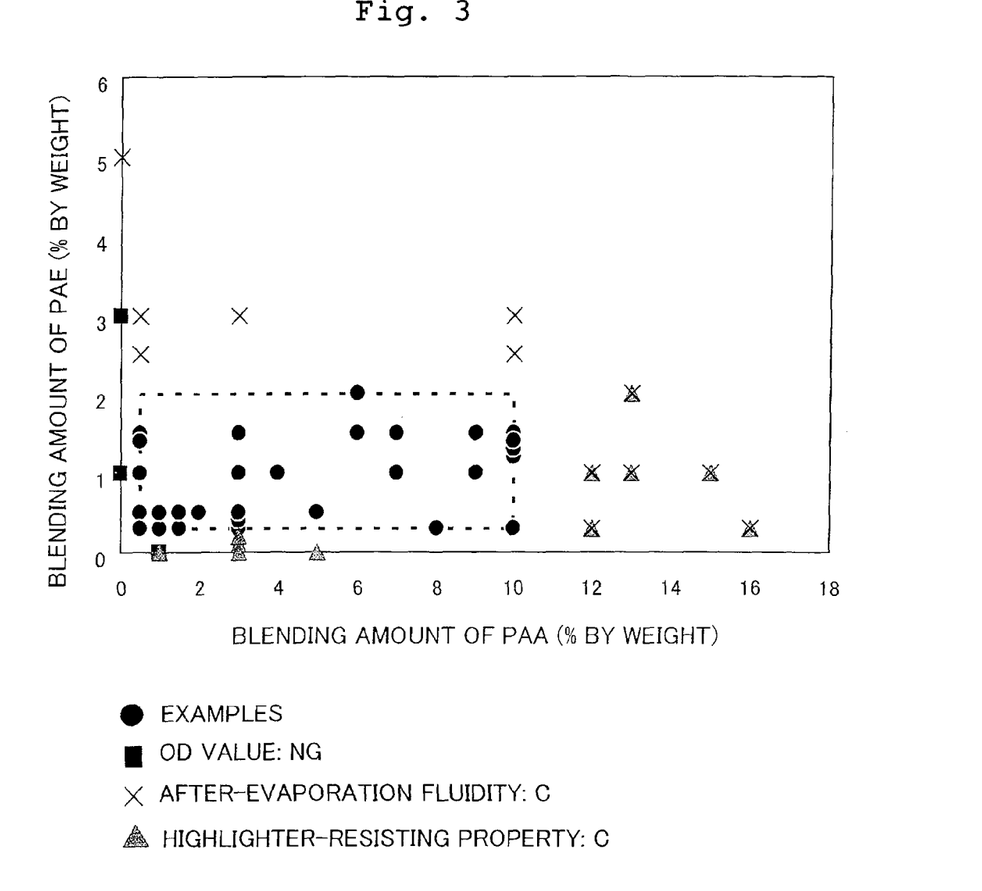
FIG. 3 is a graph showing a relationship between a blending amount of polyallylamine (PAA) and a blending amount of polyamidepolyamine-epihalohydrin copolymer (PAE).

FIG. 3 visually indicates the results of Examples 1-38 and Comparative Examples 1-25. Further, FIG. 3 indicates a range, in which the blending amount (active-ingredient amount conversion) of the component (A) with respect to the total amount of the treatment solution is 0.5% by weight to 10% by weight and the blending amount (active-ingredient amount conversion) of the component (B) with respect to the total amount of the treatment solution is 0.3% by weight to 2% by weight, as a range surrounded by broken lines. The compositions of Examples 1-38 all fall within the range surrounded by the broken lines, and had satisfactory results in all the evaluations of the optical density (OD value) of the recorded image, the highlighter-resisting property and the after-evaporation fluidity.

On the other hand, the compositions of the comparative examples having the inferior results in the evaluation of optical density are distributed on the left side or on the lower side of the range surrounded by the broken lines. Namely, in these comparative examples, the optical density is lowered in a case that the blending amount (active-ingredient amount conversion) of the component (A) or (B) with respect to the total amount of the treatment solution is small. From this, it is appreciated that not only the blending amount (active-ingredient amount conversion) of the component (A) with respect to the total amount of the treatment solution but also the blending amount (active-ingredient amount conversion) of the component (B) with respect to the total amount of the treatment solution affect the optical density.

On the other hand, the compositions of the comparative examples having the inferior results in the evaluation of highlighter-resisting property are distributed on the right side or on the lower side of the range surrounded by the broken lines. Namely, in these comparative examples, the highlighter-resisting property is lowered in a case that the blending amount (active-ingredient amount conversion) of the component (A) with respect to the total amount of the treatment solution is great (on the right side of the range surrounded by the broken lines) or in a case that the blending amount (active-ingredient amount conversion) of the component (B) with respect to the total amount of the treatment solution is small (on the lower side of the range surrounded by the broken lines). It is appreciated that the highlight-resisting property cannot be improved even when the blending amount (active-ingredient amount conversion) of the component (B) with respect to the total amount of the treatment solution is 0.3% by weight to 2% by weight but when the blending amount (active-ingredient amount conversion) of the component (A) with respect to the total amount of the treatment solution is too great. In the present teaching, the balance between the blending amounts (active-ingredient amount conversion) of the components (A) and (B) with respect to the total amount of the treatment solution is important.

Further, the compositions of the comparative examples having the inferior results in the evaluation of after-evaporation fluidity are distributed on the right side or on the upper side of the range surrounded by the broken lines. Namely, in these comparative examples, the aver-evaporation fluidity is lowered in a case that the blending amount (active-ingredient amount conversion) of the component (A) or (B) with respect to the total amount of the treatment solution is great. It is also appreciated that when the blending amount (active-ingredient amount conversion) of the component (A) or (B) with respect to the total amount of the treatment solution is great, the evaluation of the highlighter-resisting property is also lowered together with the evaluation of the after-evaporation fluidity. Further, even when the component (A) is contained within an appropriate range of the blending amount (active-ingredient amount conversion) with respect to the total amount of the treatment solution, the after-evaporation fluidity is still lowered when the blending amount (active-ingredient amount conversion) of the component (B) with respect to the total amount of the treatment solution is excessively great. From this, it is appreciated that it is important in the present teaching to adjust the blending amount (active-ingredient amount conversion) of the component (A) with respect to the total amount of the treatment solution and the blending amount (active-ingredient amount conversion) of the component (B) with respect to the total amount of the treatment solution at the same time.

From the above-described results of the examples and the comparative examples, it is considered that the component (A) and the component (B) in the treatment solution are mutually associated or correlated to affect the evaluation of optical density (OD value) of the recorded image, the evaluation of highlighter-resisting property and the evaluation of the after-evaporation fluidity. Accordingly, the present teaching makes the blending amount (active-ingredient amount conversion) of the components (A) and (B) with respect to the total amount of the treatment solution be within appropriate ranges respectively, namely the blending amount (active-ingredient amount conversion) of the component (A) is made to be 0.5% by weight to 10% by weight with respect to the total amount of the treatment solution and the blending amount (active-ingredient amount conversion) of the component (B) is made to be 0.3% by weight to 2% by weight with respect to the total amount of the treatment solution, in order to satisfy the three properties as described above at the same time.

As described above, the treatment solution for ink-jet recording of the present teaching is capable of improving the optical density (OD value) of a recorded image, and has excellent highlighter-resisting property and excellent after-evaporation fluidity. The usage of the treatment solution of the present teaching is not particularly limited; and the treatment solution is widely applicable to a variety of kinds of ink-jet recording.

What is claimed is:

1. A treatment solution used for ink jet recording, comprising:
   polyallylamine contained in the treatment solution in an amount of 0.5% by weight to 10% by weight;
   polyamidepolyamine-epihalohydrin copolymer contained in the treatment solution in an amount of 0.3% by weight to 2% by weight; and
   water;
   wherein the polyamidepolyamine-epihalohydrin copolymer has a viscosity, at an amount of 25% by weight, of 5 mPa-second to 10,000 mPa-second.

2. The treatment solution according to claim 1, wherein the polyamidepolyamine-epihalohydrin copolymer is represented by the following general formula (1):

(1)

in the general formula (1), each of "a", "b", "c" and "n" is a positive integer; and $X^-$ is a halide ion.

3. A water-based ink set for ink jet recording, comprising:
a water-based ink for inkjet recording containing a pigment, water and a water-soluble organic solvent; and
the treatment solution as defined in claim 1.

4. An inkjet recording method for performing recording on a recording medium, the method comprising:
applying, to the recording medium, the treatment solution of the water-based ink set for inkjet recording as defined in claim 3; and
discharging, to the recording medium, the water-based ink of the water-based ink set for inkjet recording.

5. The ink jet recording method according to claim 4, wherein the water-based ink is discharged to the recording medium after the treatment solution has been applied to the recording medium.

6. An ink-jet recording apparatus which performs recording on a recording medium, the apparatus comprising:
an ink-set accommodating section which accommodates the water-based ink set for ink-jet recording as defined in claim 3 therein;
a treatment solution applying mechanism which applies, to the recording medium, the treatment solution of the water-based ink set for ink-jet recording; and
an ink discharge mechanism which discharges, to the recording medium, the water-based ink of the water-based ink set.

7. The ink jet recording apparatus according to claim 6, wherein the treatment solution applying mechanism is a discharge mechanism which discharges the treatment solution to the recording medium.

* * * * *